(No Model.)
B. F. WESTMORELAND.
CULTIVATOR AND HARROW.
No. 426,888. Patented Apr. 29, 1890.
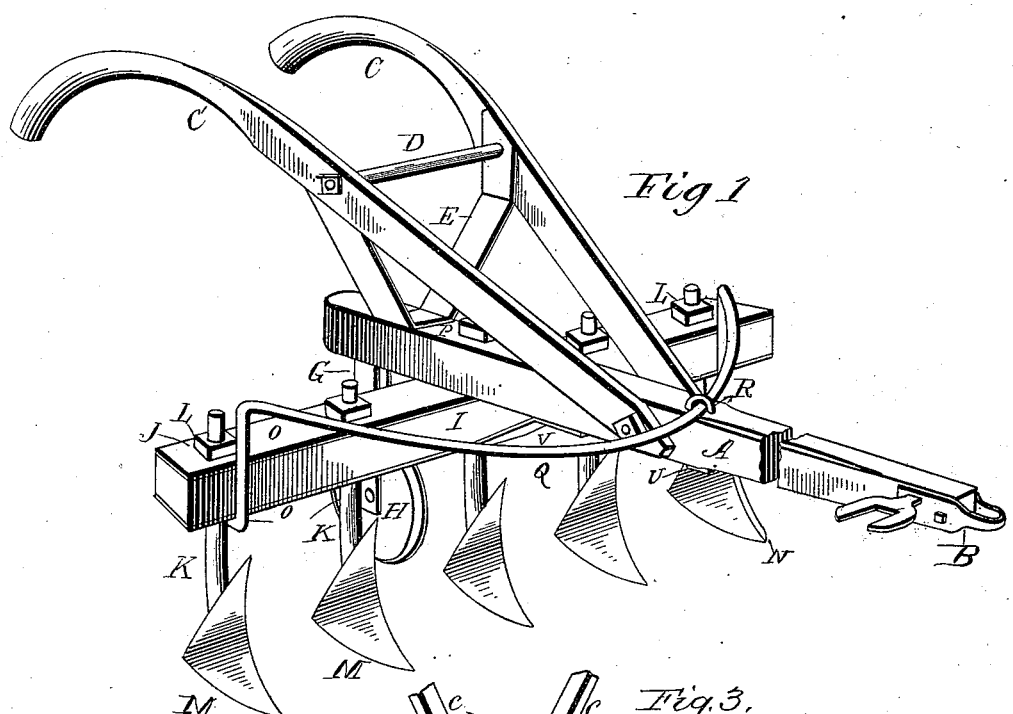
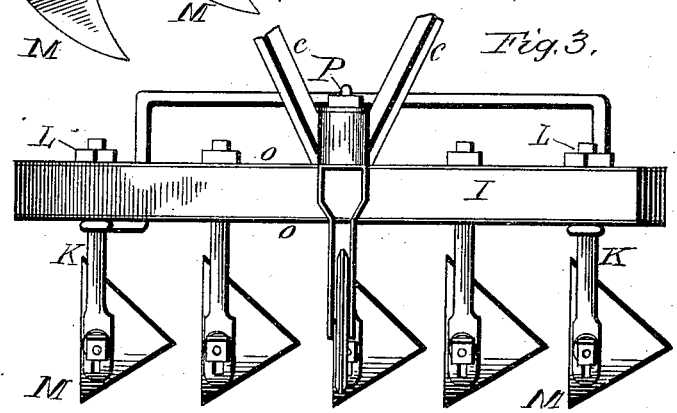
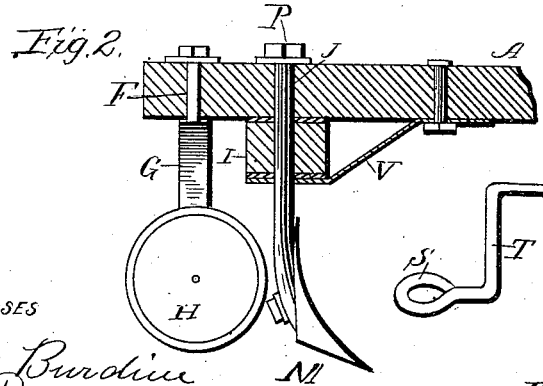
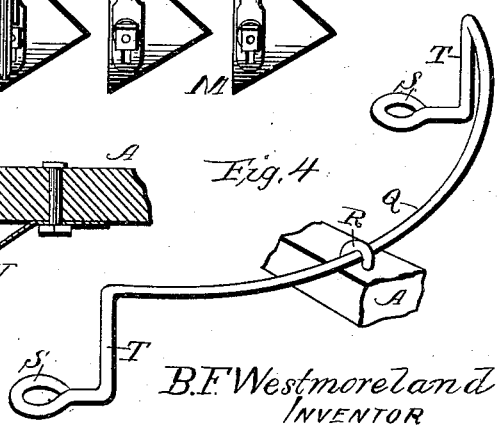
B. F. Westmoreland
INVENTOR
WITNESSES
By his Attorney
W. T. FitzGerald

UNITED STATES PATENT OFFICE.

BENJIMAN FRANKLIN WESTMORELAND, OF OSYKA, MISSISSIPPI.

CULTIVATOR AND HARROW.

SPECIFICATION forming part of Letters Patent No. 426,888, dated April 29, 1890.

Application filed December 16, 1889. Serial No. 333,886. (No model.)

*To all whom it may concern:*

Be it known that I, BENJIMAN FRANKLIN WESTMORELAND, a citizen of the United States, residing at Osyka, in the county of Pike and State of Mississippi, have invented certain new and useful Improvements in Cultivators and Harrows; and I do hereby declare the following to be a full, clear, and exact description of the invention, such as will enable others skilled in the art to which it appertains to make and use the same.

My invention relates to improvements in cultivators; and it consists in certain novel features hereinafter described and claimed.

In the accompanying drawings, which fully illustrate my invention, Figure 1 is a perspective view of a cultivator embodying my invention. Fig. 2 is a central longitudinal section of the same. Fig. 3 is a rear elevation of the cultivator, and Fig. 4 is a detail view of the yoke.

Referring to the drawings by letter, A designates the beam or tongue of the cultivator, which is of the usual or any preferred construction. A clevis B is secured to the front end of the tongue, and at an intermediate point of the tongue I secure thereto the handles C, which project upward and rearward, as shown. The handles are connected and braced by the rod D, and they are supported in their elevated position by the V-shaped standard or bracket E, which has its central portion secured to the upper side of the beam at the rear end of the same, and its ends secured to the handles or the ends of the rod D. The bolt F, which secures the bracket or standard to the tongue, passes downward through the tongue, and a divided standard G is swiveled on the lower end of the said bolt, a guiding wheel or caster H being journaled in the lower ends of said standard, as clearly shown.

A tooth-bar I is arranged beneath the tongue and in advance of the guiding-wheel, and this tooth-bar is provided with a longitudinal series of vertical openings J. The standards or shanks K, to which the shovels are secured, have cylindrical upper ends, which are inserted through the openings J, and securing-nuts L are mounted on the upper ends of the standards and adapted to be turned home against the beam or tooth-bar to secure the standards to the said bar. The shovels M are secured to the lower ends of the standards in the usual manner, and while any desired form of shovel may of course be used I prefer the triangular shovel shown in the drawings, as this form provides a sharper point than the ordinary form and has been found to more thoroughly cut up the soil. The shovel at the left-hand end of the tooth-bar is provided on its front side with the forwardly-projecting rib or blade N, which is adapted to cut off any weeds or roots which may be upon the ground to be cultivated.

The liability of the tooth-bar to be split by the strain put upon it is overcome by the use of re-enforcing plates O, which are secured to the upper and lower sides of the bar. The tooth-bar is secured to the tongue by having the central standard extended upward through the tooth-bar and the tongue, and provided with a nut P on its upper end, which is adapted to be turned home against the tongue, and thereby secure the tongue and the bar together. The bar is further connected with the tongue by a yoke Q, which has its ends secured to the ends of the bar, and its central portion passing over the tongue and through an eyebolt or hook R, which is mounted in the tongue, as shown. The ends of the yoke are provided with the eyes or rings S, which encircle the standards, and in advance of said eyes the yoke is provided with the upturned portions T, the said upturned portions passing upward in front of the tooth bar, so that the main portion of the yoke may rest upon the tongue and move freely over the same. The eyebolt R has a nut U mounted on its lower end, so that the said bolt may be tightened to secure the yoke in any desired position to which it may be adjusted, thereby holding the tooth-bar firmly at any desired angle to the row being cultivated. The tooth-bar is further braced and enabled to resist the strain put upon it by a plate or bar V, which has its front end secured to the under side of the tongue and its rear end secured to the tooth-bar and passing around the central standard.

From the foregoing description, taken in connection with the accompanying drawings, the operation and advantages of my improved cultivator will be readily understood. The device is drawn over the ground in the usual manner, and the shovels take into and turn up the soil so that it will be thoroughly loosened and pulverized and rendered fit for planting. The tooth-bar can be adjusted to any desired angle to the path of the machine, so as to throw the dirt more or less to one side, as will be readily understood, and will be firmly held in its adjusted position by the yoke and its connections, as described. The caster or guiding wheel aids in supporting the device and facilitates the guiding thereof, as it enters the ground slightly, and thereby tends to prevent the machine from turning to one side. The standards which carry the shovels being cylindrical, they can be readily secured at any desired angle.

The device is very simple in its construction, is composed of few parts, and its advantages are thought to be obvious without further reference thereto.

Having thus described my invention, what I claim, and desire to secure by Letters Patent, is—

The improved cultivator herein described and shown, consisting of the tongue, the divided standard swiveled to the rear end of the tongue, the caster-wheel journaled in the lower end of the said standard, the tooth-bar pivoted to the tongue in advance of the said standard, the teeth carried by said bar, and the yoke having its ends pivoted to the end teeth and its central portion adjustably secured to the tongue, as set forth.

In testimony whereof I affix my signature in presence of two witnesses.

BENJIMAN FRANKLIN WESTMORELAND.

Witnesses:
 JOSEPH MIXON,
 W. T. SPEARS.